UNITED STATES PATENT OFFICE.

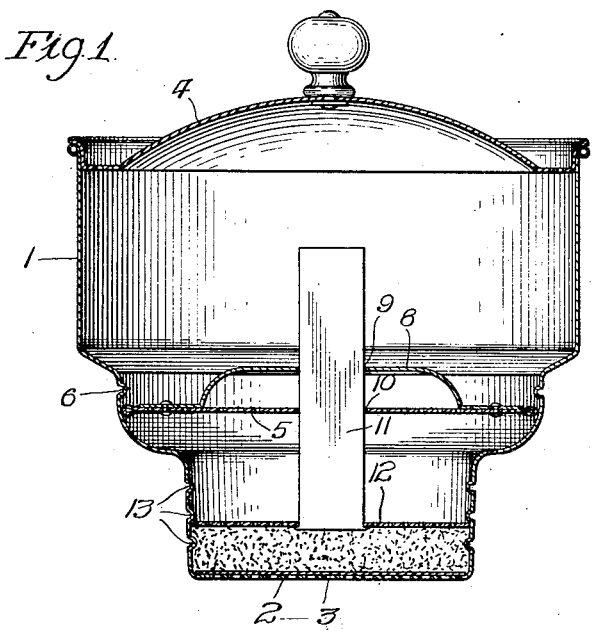
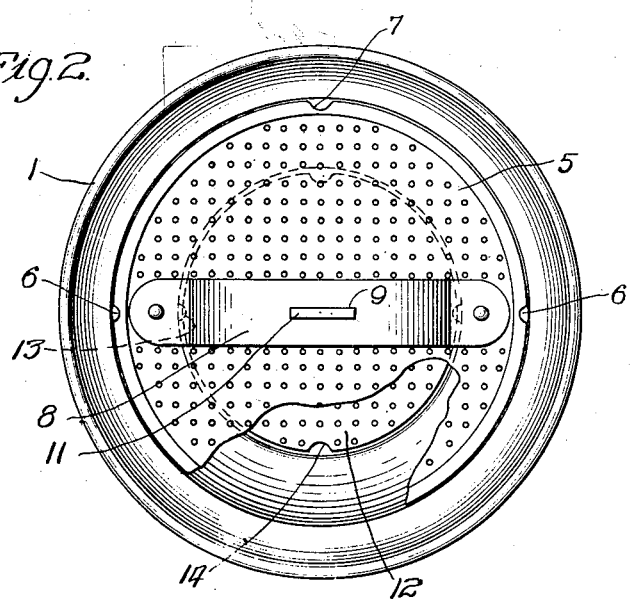

ISAAC D. RICHHEIMER, OF CHICAGO, ILLINOIS.

COFFEE-INFUSER.

1,172,390.     Specification of Letters Patent.     Patented Feb. 22, 1916.

Application filed November 2, 1914. Serial No. 869,771.

*To all whom it may concern:*

Be it known that I, ISAAC D. RICHHEIMER, a citizen of the United States, residing at Chicago, in the county of Cook and State of Illinois, have invented certain new and useful Improvements in Coffee-Infusers, of which the following is a specification.

My invention relates to a device for preparing infusions of coffee.

Infusion devices have heretofore been known but have been subject to a serious disadvantage in that it has been necessary in order to get the proper infusion to fill the coffee chamber completely with the coffee for the reason that the coffee will float in the water and allow the water to pass too readily therethrough unless confined.

It is an object of my invention to provide an infusion device which is capable of use with varying amounts of coffee depending on the quantity and strength of the liquid desired.

Other objects and advantages of my invention will be apparent as the same is better understood by reference to the following specification in connection with the accompanying drawing in which—

Figure 1 is a vertical section through my improved coffee infusing device, and Fig. 2 is a plan view of the same with the cover removed.

Referring to the drawing, 1 indicates a receptacle which may be of varying form, the form indicated being merely that preferred by me. The receptacle may be of aluminium or other suitable material. The lower portion of the receptacle is preferably reduced in size in order that it may be readily inserted in a suitable receiving vessel and is provided with a perforated bottom 2 over which a filter paper 3 of special composition is adapted to be placed, when the infuser is in use, to support the coffee and prevent it from passing through the perforations. A cover 4 is provided for the receptacle 1. Within the receptacle 1 a perforated water-spreader 5 is removably disposed, being normally held in place by indentations or lugs 6 in the walls of the receptacle. Corresponding notches 7 are provided in the water-spreader 5 so that the water-spreader may be disposed beneath the lugs 6 and on being turned will be temporarily locked within the receptacle 1. A guide 8 is disposed upon and secured to the water-spreader 5 and slots or other suitable openings 9 and 10, respectively, are provided in the guide 8 and the water-spreader 5. The openings 9 and 10 are adapted to receive a standard 11 at the lower end of which a perforated plate 12 is secured. The plate 12 is adapted to rest lightly on the coffee which is disposed above the filter paper 3 and prevent the coffee from floating in the water as the receptacle 1 is filled. It will be readily understood that the plate 12 is adjustable to any height up to the full capacity of the lower portion of the receptacle 1 below the water-spreader 5 and that the plate 12 will hold the coffee with sufficient compactness to prevent floating of the particles in the water while allowing the water to percolate through the coffee and the filter paper 3. A plurality of lugs or indentations 13 are provided in the walls of the lower portion of the receptacle 1 and corresponding notches 14 are provided in the plate 12, whereby the plate 12 may be temporarily locked in the desired position. The indentations 13 are preferably alined with the indentations 6 so that the plate 12 and the water-spreader 5 may be simultaneously inserted.

In practice the charge of coffee is placed in the receptacle, the plate and water spreader are placed therein, then the receptacle is mounted on the coffee or other receiving means and a sufficient quantity of boiling water is poured into the receptacle above the water spreader. The water slowly percolates down through the coffee and produces a clear and superior coffee infusion. A large or small quantity of the coffee infusion may be prepared with equal facility by varying the charge of coffee and the amount of water added.

It will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a coffee infusing device, the combination of a receptacle provided with a perforated bottom adapted to support a charge of coffee, perforated means adapted to spread the water as it is supplied to the receptacle, a guide mounted on said spreading means in spaced relation therewith, perforated means slidably mounted in said guide and spreading means and adapted to rest upon the charge of coffee and prevent it from floating in the water, and means for temporarily locking said spreading means and said slidably mounted means within said receptacle.

2. In a coffee infusing device the combination of a receptacle, having a lower portion of reduced size whereby it is adapted to be inserted in a suitable receiving means, the reduced portion forming a shoulder, a perforated bottom at the extremity of said reduced portion adapted to support a charge of coffee, a perforated plate for spreading the water as it is supplied to said receptacle, adapted to be supported by said shoulder, a guide mounted on said spreader plate, a standard slidably mounted in said guide and spreader plate, and a perforated plate carried by said standard and adapted to rest on the charge of coffee and prevent it from floating in the water.

ISAAC D. RICHHEIMER.

Witnesses:
ERNEST H. MERCHANT,
W. T. WESTERBERG.